United States Patent [19]

Pangburn et al.

[11] Patent Number: 4,470,905
[45] Date of Patent: Sep. 11, 1984

[54] MECHANISM FOR EXTRACTION OF IMMISCIBLE, LESS DENSE MATERIAL FROM A FLUID

[76] Inventors: Warren E. Pangburn, Rte. 3, Box 134, Muckwonago, Wis. 53149; Arthur A. Morr, 2819 Colfax, Evanston, Ill. 60201

[21] Appl. No.: 229,525

[22] Filed: Jan. 29, 1981

Related U.S. Application Data

[63] Continuation of Ser. No. 155,521, Jun. 2, 1980, abandoned, which is a continuation of Ser. No. 967,373, Dec. 7, 1978, abandoned.

[51] Int. Cl.³ .................................. B01D 21/04
[52] U.S. Cl. ............................ 210/136; 210/243; 210/523
[58] Field of Search ............... 210/167, 525, 703, 712, 210/765, 800, 805, 136, 194, 243, 523

[56] References Cited

U.S. PATENT DOCUMENTS

| | | | |
|---|---|---|---|
| 1,069,169 | 8/1913 | Parker | 210/221 |
| 2,401,745 | 6/1946 | Brown | 209/168 |
| 2,746,605 | 5/1956 | Baum | 210/726 |
| 2,788,954 | 4/1957 | Paasche | 261/5 |
| 2,805,844 | 9/1957 | McMaster | 261/3 |
| 2,813,074 | 11/1957 | Banks et al. | 210/703 |
| 2,888,139 | 5/1959 | Fischer | 210/221 |
| 2,920,763 | 1/1960 | Lind et al. | 210/221 |
| 2,982,723 | 5/1961 | Arnold et al. | 210/221 |
| 2,994,432 | 8/1961 | Schluter | 210/101 |
| 3,015,396 | 1/1962 | Quast | 210/525 |
| 3,121,680 | 2/1964 | Ciabattari | 210/703 |
| 3,123,455 | 3/1964 | Paasche | 55/228 |
| 3,175,687 | 3/1965 | Jones | 210/120 |
| 3,286,844 | 11/1966 | Juell | 210/523 |
| 3,301,779 | 1/1967 | Kovacs | 210/221 |
| 3,341,016 | 9/1967 | Paasche | 210/167 |
| 3,637,490 | 1/1972 | Gardner et al. | 210/221 |
| 3,642,617 | 2/1972 | Brink et al. | 210/221 |
| 3,679,056 | 7/1972 | Haymore | 210/221 |
| 3,822,204 | 7/1974 | Sako et al. | 210/221 |
| 3,846,299 | 11/1974 | Krasnoff | 210/221 |
| 4,102,303 | 7/1978 | Cordier | 118/326 |

*Primary Examiner*—Ivars C. Cintins
*Attorney, Agent, or Firm*—Eugene F. Friedman

[57] ABSTRACT

A process and mechanism for extracting oil based paint and other generally less dense, immiscible materials from water circulated through a spray paint booth includes a tank which receives the mixture of water and paint through an opening in the bottom of the tank. The mixture is directed through the tank so that the less dense paint floats and is directed toward a beach or inclined plane member projecting into the tank. The floating material is then skimmed from the surface of the water in the tank. Clean water is simultaneously withdrawn from the bottom of the tank and recirculated through the spray paint booth. In a preferred embodiment, the tank is used in combination with an electrostatic water treater which treats water circulating through the spray booth. Such treatment enhances subsequent mechanical separation of the paint from the water.

14 Claims, 6 Drawing Figures

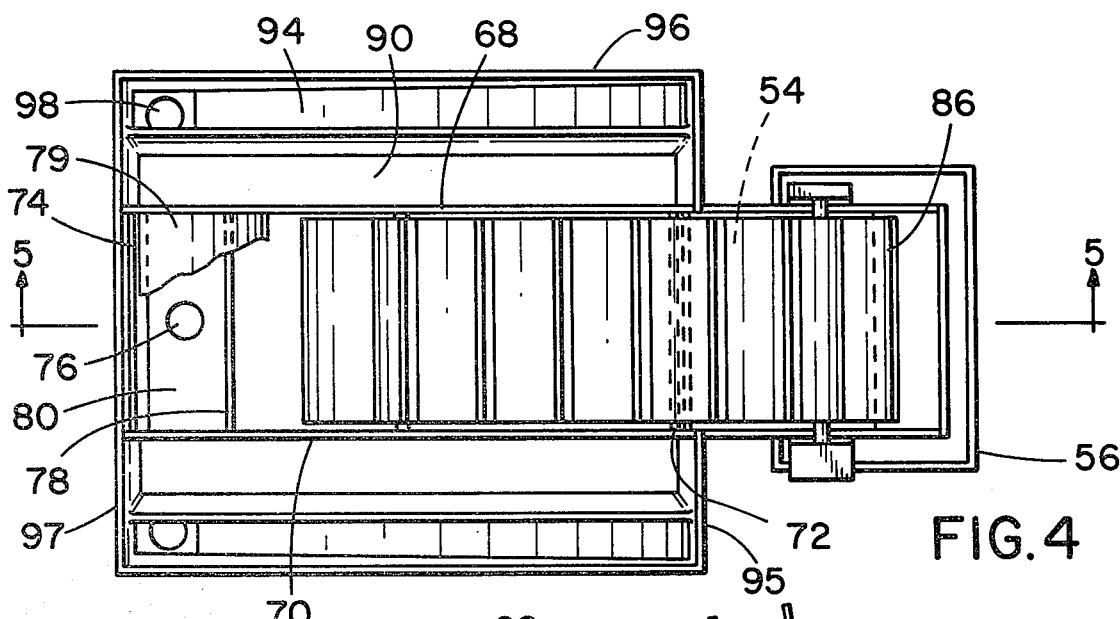
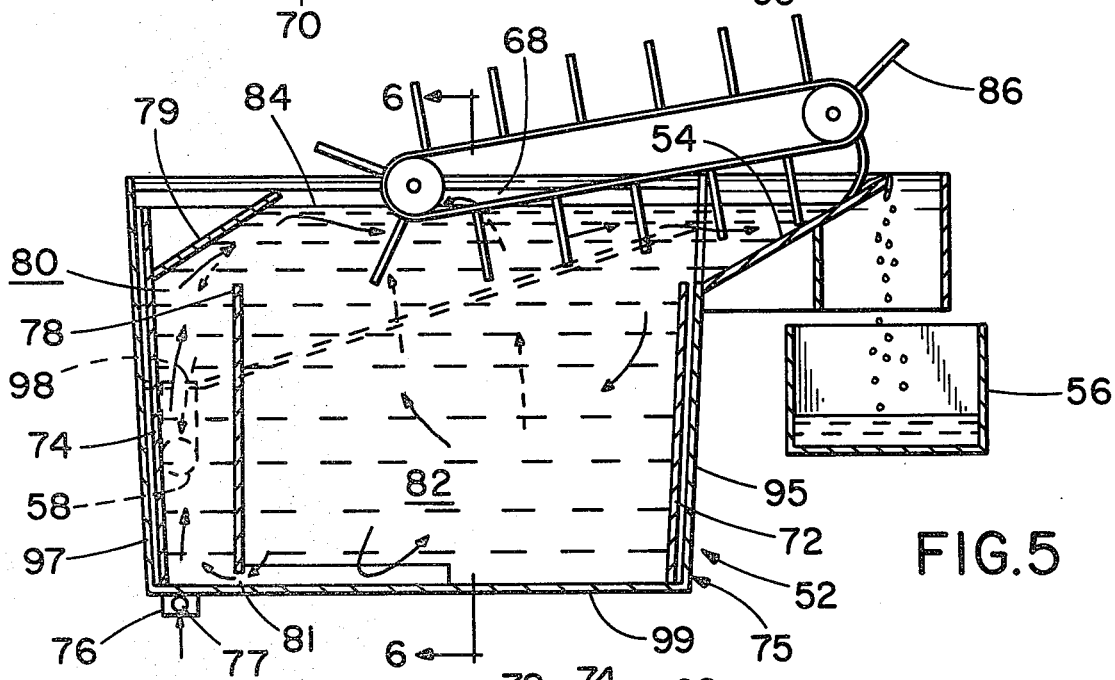
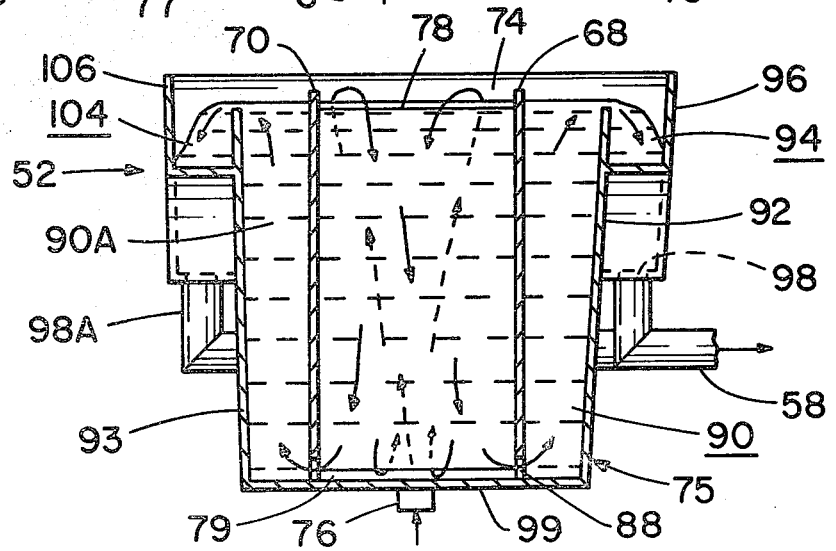

MECHANISM FOR EXTRACTION OF IMMISCIBLE, LESS DENSE MATERIAL FROM A FLUID

This is a continuation of application Ser. No. 155,521, filed June 2, 1980 which is, in turn, a continuation of Ser. No. 967,373 filed Dec. 7, 1978, both now abandoned.

BACKGROUND OF THE INVENTION

Tis invention relates to an improved mechanism and process for separating generally immiscible fluids and, more particularly, to a separation device and process for separating an immiscible, low density fluid from a higher density carrier fluid.

Commercial painting operations generally include a paint spray booth which is designed to capture overspray. Typically the overspray is captured by water flowing along the sides, back or bottom of the spray booth. Paint overspray is entrained in this manner in the water and the polluted water is then flushed from the spray booth or retained in a reservoir in the booth.

Because of environmental standards and antipollution requirements, the paint laden, polluted water cannot be discharged into a sewage system without some treatment for removal of the paint. Moreover, in order to conserve water, it is desirable to remove the paint from the water and recirculate the water through the spray booth.

In the past, various proposals have been made to accomplish these objectives. For example, coleasing chemicals may be added to the polluted water to cause the paint material to float or settle out as a sludge. The sludge is then removed or skimmed from a reservoir and the purified water may be recycled through the paint booth. Such chemical coleasing procedures are not always entirely effective inasmuch as the chemical coleasing agent may pollute the water.

Another proposal has been made by Palen Manufacturing Company, Inc. of Inverness, Ill. Palen Manufacturing Company developed a prototype device which provides for circulation of a portion of the mixed water carrier fluid and overspray, pollutant material through a separation tank. The Palen Manufacturing Company device is illustrated in FIG. 1.

As illustrated in FIG. 1 and described in greater detail below, an influx of contaminated carrier water is directed into a reservoir in an upward direction. The contaminant material is supposed to float and be scraped from the surface of the fluid in the reservoir. Fluid discharge passages are provided at the bottom and side of the reservoir. The side discharge is cooperative with an adjustable wier which is utilized to maintain the level of liquid in the reservoir.

While an improvement over known methods and apparatus for separation, the Palen device does not totally accomplish the desired objectives of separation of the carrier material from the pollutant material. As a consequence, improvements in the method of separation and the apparatus used for separation of such materials continued. The present invention overcomes many of the drawbacks associated with the referenced prior art apparatus and methods.

SUMMARY OF THE INVENTION

In a principal aspect the present invention comprises an improved device and process for collecting, separating, and removing an immiscible pollutant material from a carrier fluid. The process provides for entraining the pollutant material within the carrier fluid and transporting that combination of materials to a separation reservoir. There in the reservoir the material is separated by means of controlled flows of the carrier fluid. Primarily, a surface flow of the carrier fluid is directed toward an inclined plane member or beach projecting into the reservoir. An optional scraper then gathers the immiscible floating pollutant material from the top of the carrier fluid and discharges it from the reservoir. The configuration of the reservoir causes cycling of water through the reservoir in a prescribed pattern and insures a proper and continuous flow of carrier fluid and pollutant material toward the inclined plane member.

It is thus an object of the present invention to provide an improved process and device for collecting, separating and removing an immiscible pollutant material from a carrier fluid.

Still a further object of the present invention is to provide a process which utilizes a specially constructed reservoir that facilitates separation and flotation of the pollutant material at the top of the reservoir for easy removal and separation from the carrier fluid.

Still a further object of the present invention is to provide a process for gathering overspray from a paint booth or the like, removing that overspray material from a carrier fluid associated with the paint booth and recycling the carrier fluid through the paint booth.

A further object of the present invention is to provide a mechanism having a minimum number of moving parts which will operate to separate an immiscible pollutant material from a more dense carrier fluid in a continuously cycling process.

A further object of the present invention is to provide a process and device for separating a pollutant material from a carrier fluid without necessarily using chemicals to colease the pollutant material.

Still a further object of the present invention is to provide an improved process and device for separating a pollutant material from a carrier fluid in a manner which is economical and easy to maintain.

These and other objects, advantages and features of the invention will be set forth in the detailed description which follows.

BRIEF DESCRIPTION OF THE DRAWINGS

In the detailed description which follows reference will be made to the drawing comprised of the following figures:

FIG. 4 is a top plan view of the device of FIG. 3;

FIG. 5 is a side cross-sectional view of the device of FIG. 3 taken substantially along the line 5—5 in FIG. 4; and FIG. 6 is an end view of the device in FIG. 3.

DESCRIPTION OF THE PREFERRED EMBODIMENT

Figure 1:
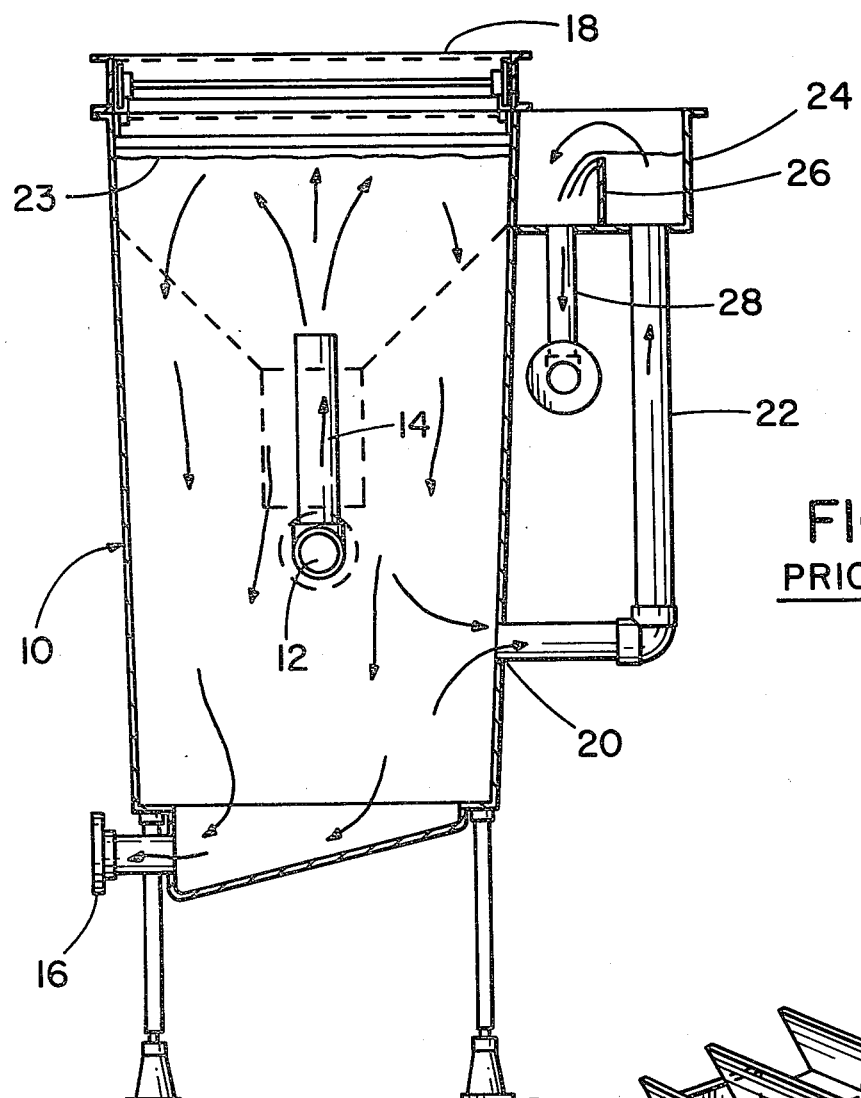
FIG. 1 is a side cross-sectional view illustrating a known prior art material separation device.
Figure 3:
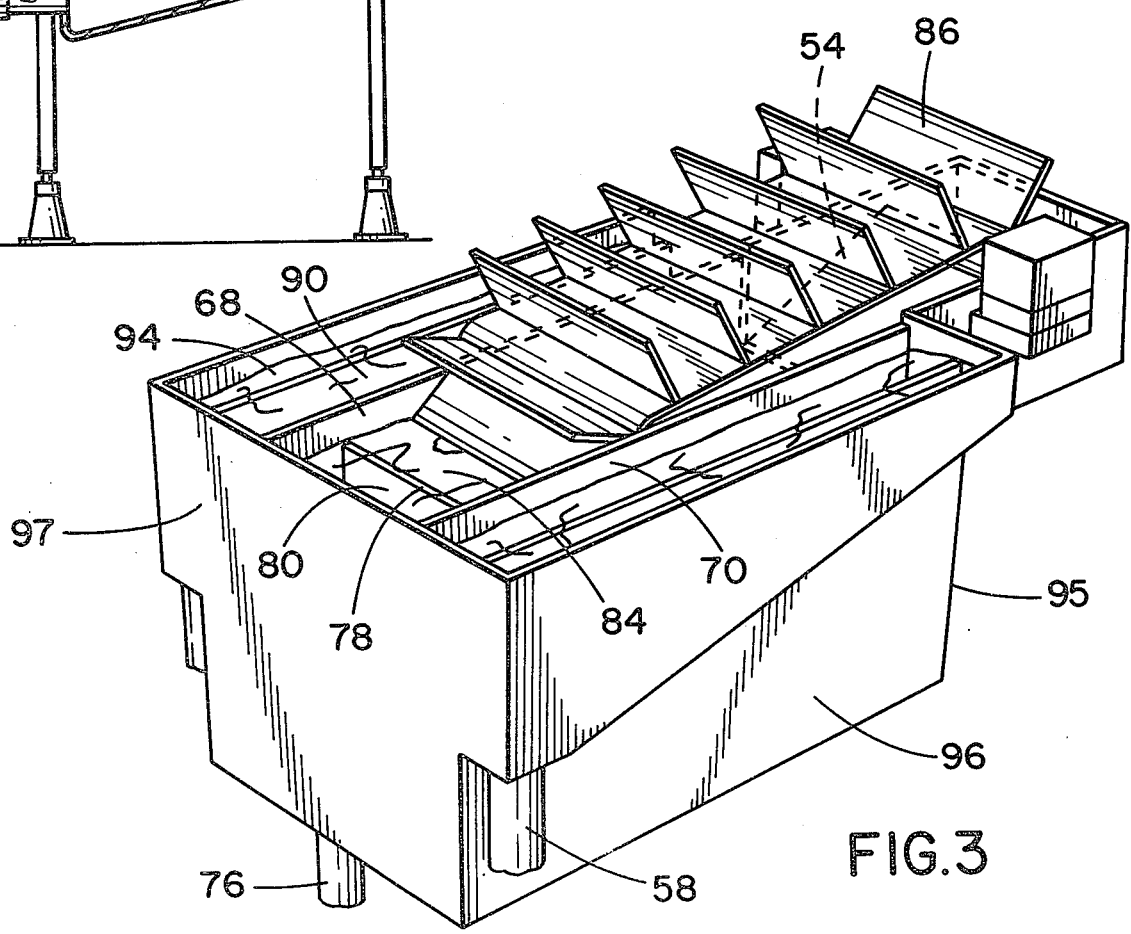
FIG. 3 is a perspective view of the mechanical separator device of the present invention.

FIG. 1 illustrates a typical prior art device used to separate oil base paint material from a water carrier.

This device is believed to be a prototype manufactured by Palen Manufacturing Company, Inc. for a test at the General Motors automobile plant in Janesville, Wis. Briefly, the device includes a reservoir 10 adapted to receive a mixture of paint and water through the inlet 12. Inlet 12 is connected to an upwardly projecting pipe 14 within the reservoir 10. Fluid flow into the reservoir 10 through pipe 14 fills the reservoir 10.

The paint theoretically rises to the top of the reservoir 10 where it is removed from the reservoir by means of a mechanical scraper 18. A drain outlet 16 is provided at the bottom of the reservoir 10 for removing fluid from the reservoir 10. The level of fluid within the reservoir 10 is controlled by controlling the flow rate at outlet 16 and by means of an overflow control outlet 20 and wier 26. Thus a second reservoir outlet 20 is connected with a vertical standpipe 22. Standpipe 22 injects water into an overflow box 24. A sidewall of the box or tank 24 defines an adjustable wier 26. Fluid which flows over the wier 26 passes through an outlet drain 28. By adjusting the height of the wier 26, the level of fluid in the reservoir 10 is simultaneously adjusted and maintained to permit mechanical scraper 18 to scrape the surface 23 of water.

The physical arrangement of the components associated with the device described in FIG. 1 did not provide for efficient separation of the water carrier fluid from the pollutant material, i.e. the paint overspray. For example, if fluid discharge through outlet 16 is too great, the level of fluid in the reservoir 10 would never be sufficient to permit control by wier 26. Skimming of pollutant material cannot occur under such circumstances. As a result, the carrier fluid would become more and more saturated with paint and may not be efficiently purified.

The improved apparatus of the present invention overcomes these difficulties. FIGS. 3-6 illustrate a first embodiment of the invention and FIG. 2 illustrates the process which incorporates apparatus of the type shown in FIGS. 3-6.

Figure 2:
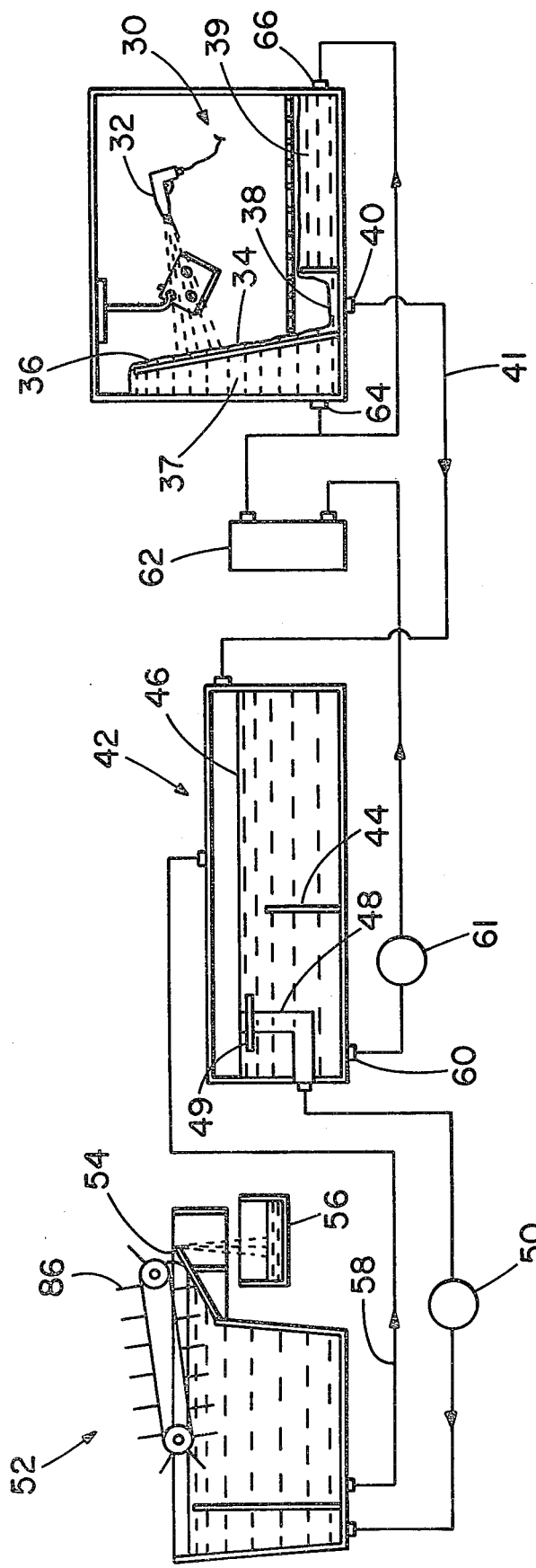
FIG. 2 is a schematic layout of a typical system incorporating the improved apparatus of the present invention and operated in accordance with the process of the present invention.

Therefore, referring first to FIG. 2, a typical paint spray booth 30 is schematically illustrated. Industrial painting is accomplished by operation of a spray gun 32 in the spray booth 30. Overspray from the spray gun 32 flows into the spray booth 30 and is entrained in flows of water which continuously migrate through the spray booth 30. Thus a flow of water 34 descends over back wall 36 of booth 30. Reservoir or collection pan 38 at the bottom of the booth 30 catches the overspray flow of water as it descends. Water or other carrier fluid laden with the overspray may also collect in a bottom reservoir 39 which flows into collection pan 38.

The fluid in pan 38 then flows through drain 40 via line 41 into a holding tank 42. The holding tank 42 may or may not be enclosed. The holding tank 42 may or may not be an integral part of the booth 30.

Water and paint within the holding tank 42 flow past an optional submerged wall 44 and are continuously drained at the surface 46 through a standpipe 48. Draining of material from the surface is an important feature of the invention since material in this region generally includes the pollutant. To insure that surface water enters standpipe 48, a flat plate 49 may be affixed as a collar to the pipe 48 a few inches below the surface 46. The plate 49 has a lateral dimension preferably of two to five times the diameter of the standpipe 48. Preferably the top of pipe 48 is one-half to one diameter below surface 46 and plate 49 is one to two diameters below the surface 46.

Surface flow into standpipe 48 may be further enhanced by diverters (not shown) at surface 46. Thus, the position of the top of pipe 48, the plate 49, the baffle wall 44 and diverters (not shown) all serve to enhance the operation of the device and method of the invention.

The water and paint mixture is next pumped by a means of pump 50 into a mechanical separator 52. It is noted that the water and paint are generally immiscible and that the paint has a lower density than the water.

The mechanical separator 52 is illustrated in greater detail in FIGS. 3-6 and will be described with respect to those figures as well as FIG. 2. For purposes of generally understanding the invention, the mechanical separator 52 operates to float the pollutant material and discharge that material along an inclined plane member 54 into a collector 56. The separated clean water, which is generally not contaminated, flows through line 58 from the separator 52 back into the reservoir or holding tank 42. In this manner the water and any unseparated paint or pollutant materials are continuously recycled with consequent removal of the pollutant materials.

Purified carrier fluid is finally withdrawn through a bottom drain 60 of tank 42 and is directed by pump 61 preferably through an electrostatic water treater 62 and subsequently back into the spray booth 30 through inlets 64 and 66 connected respectively with reservoirs 37 and 39. In this manner water as a carrier fluid is continuously cycled through the system and purified principally by the removal of pollutants at the separator 52.

A preferred type of water treater 62 is that manufactured by Electrostatic Equipment Company, Kansas City, Mo. U.S. Pat. Nos. 4,073,712; 4,073,273 and 3,769,188 disclose such water treaters and are incorporated herewith by reference. Treatment with such an electrostatic water treater 62 in the described system greatly enhances the separation results produced by the separator 52. It is for this reason that such a water treater 62 is preferred though optional.

It is to be noted that the holding tank 42 may be removed from the system and water or carrier fluid along with pollutant material may pass directly from the spray booth 30 to the mechanical separator 52. In such an embodiment of the invention, a standpipe would be provided within the booth 30 to direct polluted water to the separator.

It is also to be noted that in order for the invention to operate in an appropriate manner, the pollutant material is generally immiscible in the carrier fluid and is generally of a lesser density than the density of the carrier fluid. Thus, oil based paints may be the pollutant materials with water as the carrier fluid. Coleasing agents may also be used to enhance the immiscibility and density requirements.

Referring to FIGS. 3-6, the separator 52 is comprised of an inner tank or separation chamber having tank sidewalls 68 and 70, tank end walls 72 and 74 and an open bottom. A surrounding or outer tank 75 is formed of sidewalls 92, 93 end walls 95, 97 and bottom 99. Inner tank fits within outer tank 75.

A fluid inlet 76 in bottom wall 99 receives the mixed carrier fluid and pollutant material directly from the spray booth 10 or from separate reservoir 42. It is possible to include a check valve 77 at the inlet 76 to insure that the fluid will not backflow through the inlet 76. A vertical upstanding wall 78 extends between sidewalls 68 and 70 in opposed relation to end wall 74 and defines a small first reservoir 80 for receipt of pollutant material and carrier fluid. The wall 78 extends vertically upward toward the top of the inner tank but does not extend to the top of the tank. As reservoir 80 fills, fluid flowing through the inlet 76 flows over the wall 78 into a second reservoir 82 defined by side walls 68, 70, end walls 72 and vertical wall 78. Inclined diverter wall 79 projecting from wall 74 insures directed flow of fluid from reservoir 80 to reservoir 82.

When the separator 52 is filled the flow of fluid through the inlet 76 into the separator 52 is generally in the direction indicated by the arrows toward a beach or an inclined plane member 54 opposite the wall 78. Beach 54 extends below the level of fluid in reservoir 80.

As the fluid material continues to circulate in a clockwise direction as shown in FIG. 5, the less dense, immiscible pollutant material or paint stays at the top of the reservoir 82 and flows onto the beach 54 where it can be removed and transferred to the collector tray 56. This removal may be effected by paddle blades 86 mounted on a driven chain conveyor or other skimming means which remove the collected pollutant material from the surface 84 of the reservoir.

The separation of the pollutant material from the carrier fluid is generally completed by a single pass through the separator 52 as described. The carrier fluid which has been separated from the pollutant material then flows through a lower slit or passage 88 in wall 68, 70 and through side reservoir 90, 90A defined by side walls 68, 70 and outside walls 92, 93. Outside walls 92, 93 are vertically extending walls which control the level of the fluid within the reservoirs 82, 90 and 90A. The carrier fluid thus flows as indicated in FIG. 6 over the side walls 92, 93 and into side collector trays 94, 104 defined by upwardly extending outside walls 96, 106 and walls 92, 93. The bottom of each collector tray 94, 104 slopes downwardly to drains 98 and 98A. Drains 98, 98A lead from the collector trays 94, 104 and connect with outlet line 58 as shown in FIG. 2.

To insure proper movement of fluid within the separator 52 a slit 81 is provided in wall 78 adjacent the bottom 99. Also the side wall slits 88 are positioned in the portion of side walls 68 and 70 adjacent the vertical wall 78. Such positioning of slits 81 and 88 facilitates fluid circulation as illustrated by the arrows in the figures. Such circulation tends to promote flotation of the pollutant materials and proper positioning of such materials on the beach 54.

The symmetrical arrangement of walls 92 and 93 as well as associated run off channels or reservoirs 94 and 104 is also quite important. The walls 68, 70 are positioned on opposite sides of inclined member 54 to insure even flow of water through the separator 52 toward the member 54.

While there has been set forth a preferred embodiment of the invention, it is to be understood that the invention shall be limited only by the following claims and their equivalents.

What is claimed is:

1. Apparatus for separating and removing an immiscible pollutant material from a carrier fluid where the pollutant material has a density less than the carrier fluid, said apparatus comprising in combination;
   (a) a reservoir having a bottom and sides;
   (b) an inlet opening in the bottom of the reservoir;
   (c) means for directing a flow of mixed pollutant material and carrier fluid through the bottom inlet opening upwardly into the reservoir, said means including an inlet pipe through the bottom;
   (d) a generally vertical upstanding first wall in the reservior extending partially toward the top of the reservoir and dividing the reservoir into an inlet section and an outlet section;
   (e) means for maintaining a fluid level in the reservoir above the level of the upstanding first wall including a second wall spaced from an outside wall of the reservoir to provide a side reservoir connected to the outlet, said second wall defining a weir which controls fluid level in the reservoir and automatically removes fluid from the reservoir when said fluid level reaches a control level equal to the level of said second wall;
   (f) means for directing surface flow of the mixed pollutant material and carrier fluid in a single direction in the reservoir from the inlet section toward the outlet section;
   (g) An upwardly inclined beach surface projecting from the outlet section of the reservoir in the path of the surface flow;
   (h) means for guiding and transferring pollutant material from the surface of the fluid onto the beach surface; and
   (i) a carrier fluid outlet means in the side wall of the outlet section of the reservoir adjacent the bottom of the reservoir for removing quantities of carrier fluid from the outlet section substantially equal to the volume quantity of mixed pollutant material and carrier fluid introduced to the inlet section of the reservoir.

2. The apparatus of claim 1 including mechanical surface sweeping means for skimming the surface of the fluid in the direction of surface flow in the reservoir and transferring pollutant material therefrom onto the beach.

3. The apparatus of claim 1 wherein said vertical upstanding wall includes an opening at the bottom of the reservoir to provide for partial recirculation of fluid flow from the outlet section to the inlet section.

4. The apparatus of claim 1 including check valve means at the inlet opening to prevent back flow of fluid.

5. Apparatus for separating and removing an immiscible pollutant material from a carrier fluid where the pollutant material has a density less than the carrier fluid, said apparatus comprising in combination:
   (a) a reservoir having a bottom and sides;
   (b) an inlet opening in the bottom of the reservoir;
   (c) means for directing a flow of mixed pollutant material and carrier fluid through the bottom inlet opening upwardly into the reservoir, said means including an inlet pipe through the bottom;
   (d) a generally vertical upstanding wall in the reservoir extending partially toward the top of the reservoir and dividing the reservoir into an inlet section and an outlet section;
   (e) a carrier fluid outlet means in the side wall of the outlet section of the reservoir adjacent the bottom of the reservoir for removing quantities of carrier fluid from the outlet section substantially equal to the volume quantity of mixed pollutant material and carrier fluid introduced to the inlet section of the reservoir;
   (f) means for maintaining a fluid level in the reservoir above the level of the upstanding wall, said means for maintaining the fluid level including a second wall spaced from an outside wall of the reservoir to provide a side reservoir connected to the outlet means from the reservoir outlet section, said second wall defining a weir which controls fluid level in the reservoir and automatically removes fluid from the reservoir when said fluid level reaches a control level equal to the level of the second wall;

(g) means for directing surface flow of the mixed pollutant material and carrier fluid in a single direction in the reservoir from the inlet section toward the outlet section;

(h) an upwardly inclined beach surface projecting from the outlet section of the reservoir in the path of the surface flow; and (i) means for guiding and transferring pollutant material from the surface of the fluid onto the beach surface.

6. Apparatus for separating and removing an immiscible pollutant material from a carrier fluid where the pollutant materials has a density less than the carrier fluid, said apparatus comprising in combination:

(a) a reservoir having a bottom and sides;

(b) an inlet opening in the bottom of the reservoir;

(c) means for directing a flow of mixed pollutant material and carrier fluid through the bottom inlet opening upwardly into the reservoir, said means including an inlet pipe through the bottom;

(d) a generally vertical upstanding wall in the reservoir extending partially toward the top of the reservoir and dividing the reservoir into an inlet section and an outlet section;

(e) means for maintaining a fluid level in the reservoir above the level of the upstanding wall;

(f) an upwardly inclined beach surface projecting from the outlet section of the reservoir in the path of a surface flow;

(g) means for directing a surface flow of the mixed pollutant material and carrier fluid in a single direction in the reservoir from the inlet section toward the outlet section, said means including a supplemental inclined diverter wall at the top of the reservoir over the inlet to divert flow of inlet fluid toward the beach surface;

(h) means for guiding and transferring pollutant material from the surface of the fluid onto the beach surface; and (i) a carrier fluid outlet means in the side wall of the outlet section of the reservoir adjacent the bottom of the reservoir for removing quantities of carrier fluid from the outlet section substantially equal to the volume quantity of mixed pollutant materials and carrier fluid introduced to the inlet section of the reservoir.

7. Apparatus for separating and removing an immiscible pollutant material from a carrier fluid where the pollutant material has a density less than the carrier fluid, said apparatus comprising in combination:

(A) a reservoir having a bottom and four sides adjoined to both said bottom and each other, at least one of said sides extending a smaller distance from said bottom than at least two other of said sides;

(B) an inlet opening in proximity to said bottom and in fluid communication with said reservoir;

(C) conduit means for directing a flow of mixed pollutant material and carrier fluid through said inlet opening upwardly into said reservoir, said means including an inlet pipe connected to and in fluid communication with said inlet opening;

(D) a generally vertical upstanding first wall in said reservoir located between said inlet opening and said one side, oriented generally perpendicular to two opposed sides, coupled to and extending further away from said bottom then said one side, and dividing said reservoir into a central reservoir and a side reservoir, said central reservoir including said inlet opening, said first wall having a first opening near said bottom;

(E) a generally vertical upstanding second wall in said reservoir oriented generally perpendicular to two opposed sides and extending a lesser distance away from said bottom of said reservoir than said one side and dividing said central reservoir into an inlet section and an outlet section, said inlet section including said inlet opening, said second wall having a second opening near said bottom, said first opening being between said outlet section and said side reservoir;

(F) carrier fluid overflow means coupled and adjacent to said side reservoir for catching carrier fluid overflowing said one side wall;

(G) carrier fluid outlet means coupled to said overflow means for removing carrier fluid from said overflow means;

(H) an upwardly inclined beach surface projecting from said outlet section of said reservoir in the path of the surface flow; and (I) means for guiding and transferring pollutant material from the surface of the fluid onto said beach surface.

8. The apparatus of claim 7 wherein said first and second openings are elongated openings oriented along said bottom.

9. The apparatus of claim 8 wherein said first and second walls contact each other.

10. Apparatus for separating and removing an immiscible pollutant material from a carrier fluid where the pollutant material has a density less than the carrier fluid, said apparatus comprising in combination:

(A) a reservoir having a bottom and two adjoined ends and two sides adjoined to both said bottom and said ends, said ends extending further from said bottom than said sides;

(B) an inlet opening in proximity to said bottom and in fluid communication with said reservoir;

(C) conduit means for directing a flow of mixed pollutant material and carrier fluid through said inlet opening upwardly into said reservoir, said means including an inlet pipe connected to and in fluid communication with said inlet opening;

(D) generally vertical upstanding first and second walls in said reservoir, said first wall being located between said inlet opening and said first side, said second wall being oriented between said inlet opening and said second side, said first and second walls being (1) oriented generally perpendicular to said ends, (2) coupled to and extending further away from said bottom then said first and second sides, and (3 dividing said reservoir into a central reservoir and first and second side reservoirs, said central reservoir including said inlet opening, said first and second walls having a first and a second opening, respectively, near said bottom;

(E) a generally vertical upstanding third wall in said reservoir oriented generally perpendicular to said sides and extending a lesser distance away from said bottom of said reservoir than said first and second sides and dividing said central reservoir into an inlet section and an outlet section, said inlet section including said inlet opening, said third wall having a third opening near said bottom, said first and second openings being between said outlet section and said first and second side reservoirs, respectively;

(F) carrier fluid overflow means coupled and adjacent to said first and second side reservoirs for catching carrier fluid overflowing said first and second side walls;

(G) carrier fluid outlet means coupled to said overflow means for removing fluid from said overflow means;

(H) an upwardly inclinded beach surface projecting from said outlet section of said reservoir in the path of the surface flow; and (I) means for guiding and transferring pollutant material from the surface of the fluid onto said beach surface.

11. The apparatus of claim 10 wherein said first, second, and third openings are elongated openings oriented along said bottom.

12. Apparatus for separating and removing an immiscible pollutant material from a carrier fluid where the pollutant material has a density less than the carrier fluid, said apparatus comprising in combination;

(a) a reservoir having a bottom and sides;
(b) an inlet opening in the bottom of the reservoir;
(c) means for directing a flow of mixed pollutant material and carrier fluid through the bottom inlet opening upwardly into the reservoir, said means including an inlet pipe through the bottom;
(d) a generally vertical upstanding wall in the reservoir extending partially toward the top of the reservoir and dividing the reservoir into an inlet section and an outlet section;
(e) means for maintaining a fluid level in the reservoir above the level of the upstanding wall;
(f) means for directing surface flow of the mixed pollutant material and carrier fluid in a single direction in the reservoir from the inlet section toward the outlet section;
(g) an upwardly inclined beach surface projecting from the outlet section of the reservoir in the path of the surface flow;
(h) means for guiding and transferring pollutant material from the surface of the fluid onto the beach surface;
(i) a carrier fluid outlet means in the side wall of the outlet section of the reservoir adjacent the bottom of the reservoir for removing quantities of carrier fluid from the outlet section substantially equal to the volume quantity of mixed pollutant material and carrier fluid introduced to the inlet section of the reservoir; and
(j) means for imparting an electric charge to the carrier fluid to thereby enhance separation of pollutant material from the carrier fluid.

13. The apparatus of claim 12 wherein said means for imparting the charge is upstream from the inlet opening.

14. Apparatus for separating and removing an immiscible pollutant material from a carrier fluid where the pollutant material has a density less than the carrier fluid, said apparatus comprising in combination;

(a) a reservoir having a bottom and sides;
(b) an inlet opening in the bottom of the reservoir;
(c) means for directing a flow of mixed pollutant material and carrier fluid through the bottom inlet opening upwardly into the reservoir, said means including an inlet pipe through the bottom;
(d) a generally vertical upstanding wall in the reservoir extending partially toward the top of the reservoir and dividing the reservoir into an inlet section and an outlet section;
(e) means for maintaining a fluid level in the reservoir above the level of the upstanding wall;
(f) means for directing surface flow of the mixed pollutant material and carrier fluid in a single direction in the reservoir from the inlet section toward the outlet section including a supplemental inclined diverter wall at the top of the reservoir over the inlet to divert flow of inlet fluid toward the beach surface;
(g) An upwardly inclined beach surface projecting from the outlet section of the reservoir in the path of the surface flow;
(h) means for guiding and transferring pollutant material from the surface of the fluid onto the beach surface; and
(i) a carrier fluid outlet means in the side wall of the outlet section of the reservoir adjacent the bottom of the reservoir for removing quantities of carrier fluid from the outlet section substantially equal to the volume quantity of mixed pollutant material and carrier fluid introduced to the inlet section of the reservoir.

* * * * *